(12) United States Patent
Suyama et al.

(10) Patent No.: US 6,742,905 B2
(45) Date of Patent: Jun. 1, 2004

(54) REARVIEW MIRROR

(75) Inventors: Terumasa Suyama, Aichi (JP); Michimasa Ito, Aichi (JP)

(73) Assignee: Kabushiki Kaisha Tokai Rika Denki Seisakucho, Aichi (JP)

( * ) Notice: Subject to any disclaimer, the term of this patent is extended or adjusted under 35 U.S.C. 154(b) by 107 days.

(21) Appl. No.: 10/200,414

(22) Filed: Jul. 22, 2002

(65) Prior Publication Data

US 2003/0016455 A1 Jan. 23, 2003

(30) Foreign Application Priority Data

Jul. 23, 2001 (JP) ........................................ 2001-221509

(51) Int. Cl.⁷ ............................................. G02B 7/182
(52) U.S. Cl. ................... 359/838; 359/839; 359/273; 359/275; 235/380; 235/384; 235/462; 701/110; 701/115
(58) Field of Search ................................ 359/838, 839, 359/273, 275; 235/380, 384, 462; 701/110, 115

(56) References Cited

U.S. PATENT DOCUMENTS

| | | | | |
|---|---|---|---|---|
| 5,459,660 A | * | 10/1995 | Berra | .......................... 701/33 |
| 5,803,043 A | * | 9/1998 | Bayron et al. | ............... 123/335 |
| 5,995,898 A | * | 11/1999 | Tuttle | .......................... 701/102 |
| 6,158,655 A | * | 12/2000 | DeVries et al. | ............. 235/380 |

FOREIGN PATENT DOCUMENTS

GB 2 352 552 A 1/2001

\* cited by examiner

*Primary Examiner*—Mohammad Sikder
(74) *Attorney, Agent, or Firm*—Crompton, Seager & Tufte, LLC (57) ABSTRACT

A rearview mirror has a housing. The housing includes a front surface facing a driver's seat, a rear surface at the opposite side of the front surface. The housing has a slot for receiving a recording medium that stores predetermined data. The slot has a width, which is larger than a width of an insert potion that of the recording medium. The recording medium is inserted into the slot at an arbitrary position in the width direction of the slot. An interface performs at least one of reading of data from the recording medium and writing of data to the recording medium. The interface includes a detector, a data input/output unit and a moving mechanism. The detector detects insertion of the recording medium into the slot. The data input/output unit swaps data with the recording medium. The moving mechanism moves one of the data input/output unit and the recording medium to a position where the data input/output unit faces the recording medium.

12 Claims, 7 Drawing Sheets

REARVIEW MIRROR

BACKGROUND OF THE INVENTION

The present invention relates to a rearview mirror provided in the passenger compartment of a vehicle.

In recent years, with the development of intelligent transport systems (ITS), incorporation of an information network into vehicles is now under progress. Together with this trend, vehicles are equipped with a human machine interface (HMI) associated with a variety of information systems. The HMI is located at a location at which a driver can easily operate it, such as near the driver's seat. For example, in an electronic toll collection system (ETC), a car-equipped ETC is provided near the driver's seat as an HMI.

Generally, a variety of operation devices, a display, and the like are provided near the driver's seat. It is therefore sometimes difficult to ensure a space for installing a car-equipped ETC. To address this problem, conventionally, there has been proposed to arrange the car-equipped ETC within a rearview mirror that is provided with multiple functions. In the following, a conventional rearview mirror 51 will be described with reference to FIGS. 7 to 9.

Figure 7:
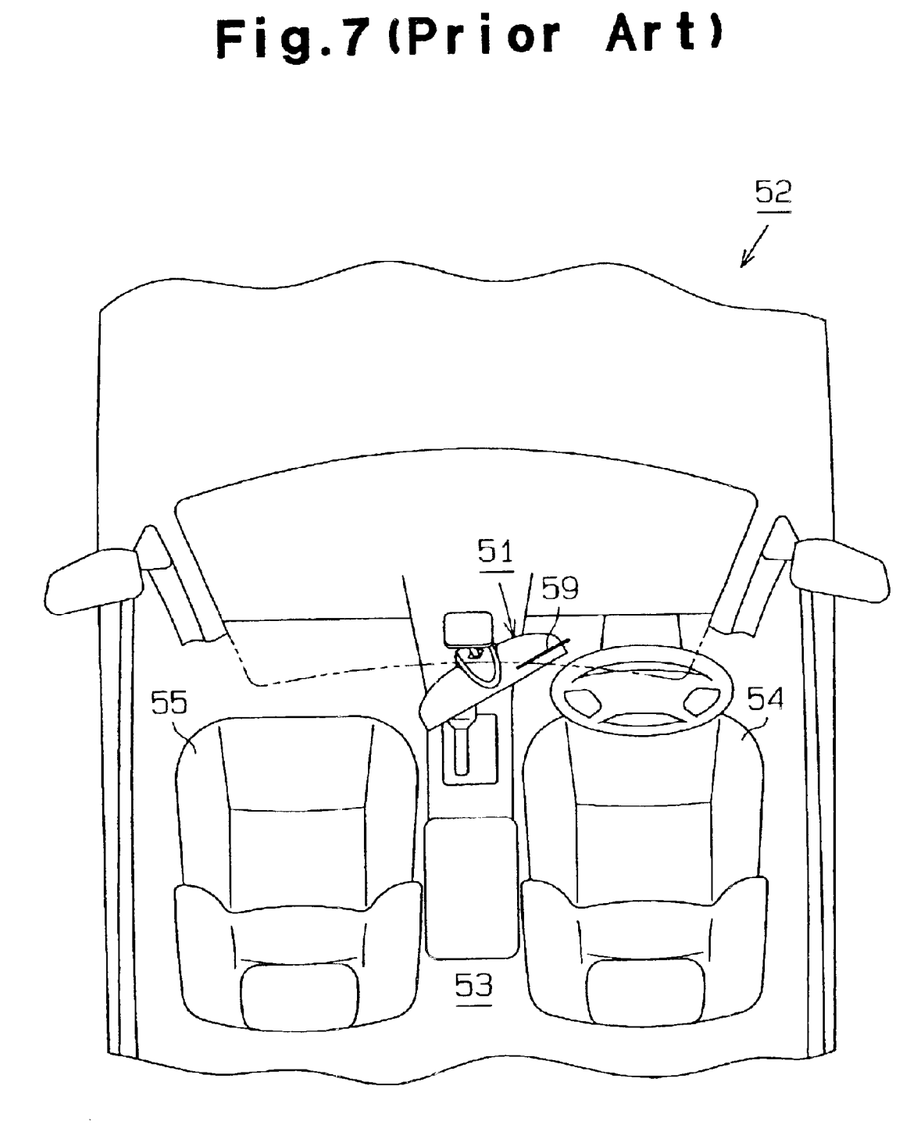
FIG. 7 is a plan view showing the passenger compartment of a vehicle equipped with a prior art rearview mirror.
Figure 8:
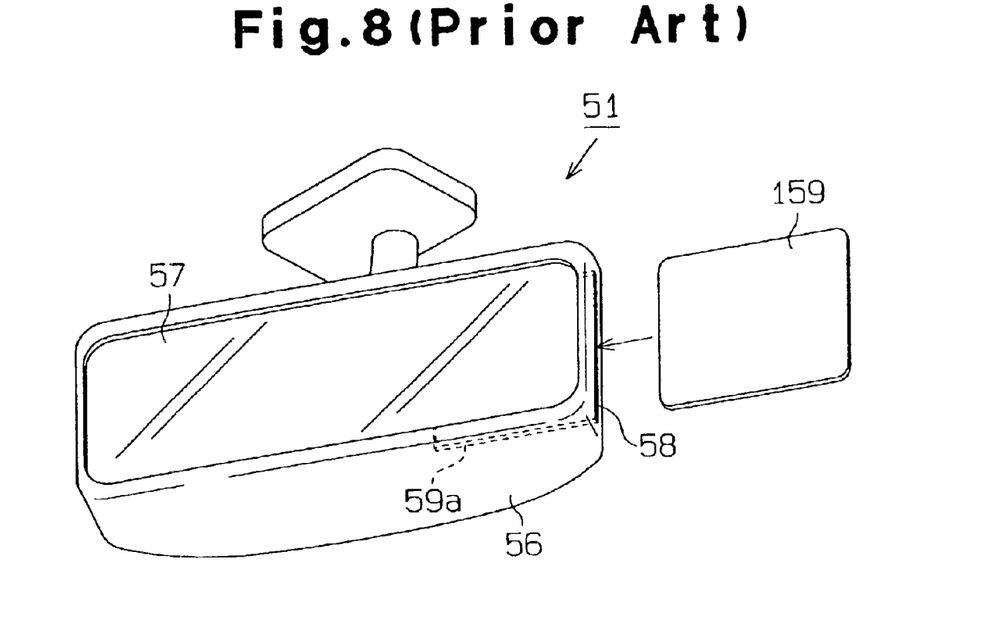
FIG. 8 is a perspective view showing the rearview mirror of FIG. 7.
Figure 9:
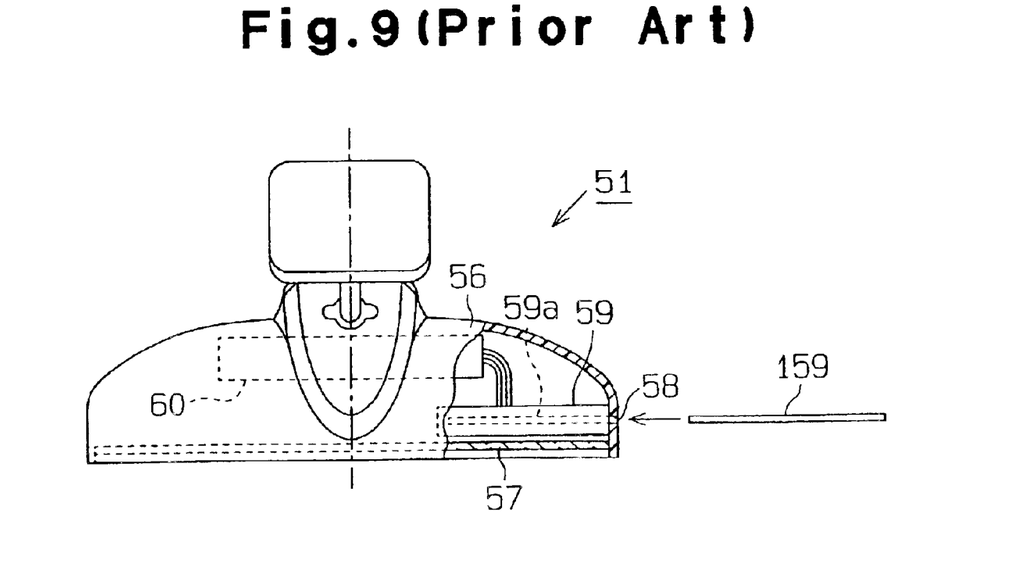
FIG. 9 is a partially cutaway plan view of the rearview mirror of FIG. 7.

As shown in FIG. 7, the rearview mirror 51 is located between a driver's seat 54 and a front passenger seat 55 in the passenger compartment 53 of a vehicle 52. As shown in FIGS. 8 and 9, the rearview mirror 51 comprises a case 56 and a mirror portion 57. The mirror portion 57 is fixed to a roof (not shown) of the vehicle 52 to orient substantially rearward. A slot 58, through which an IC card 159 is inserted as a recording medium, is formed in the case 56 at a side facing the driver's seat (on the right side as viewed in FIGS. 8 and 9).

As shown in FIG. 9, the case 56 contains an interface unit 59 and a data processing unit 60 which make up a car-equipped ETC. The interface unit 59 is provided with a card holder 59a, which is communicated with the slot 58. The card holder 59a is formed such that the IC card 159 can be inserted into or removed from the card holder 59a in a direction substantially parallel with the mirror surface of the mirror portion 57.

The width of the slot 58 is substantially equal to the width of a part of the IC card 159 that is inserted. Thus, the orientation and position of the IC card 159 relative to the slot 58 is limited. In other words, the IC card 159 cannot be inserted into the rearview mirror 51 unless the IC card 159 is precisely aligned with the slot 58.

Also, an optimal position for an operator to insert or remove the IC card 159 into or from the rearview mirror 51 largely varies depending on the physical constitution, the dominant hand, and habit of the operator. Therefore, some operators may not readily insert and remove the IC card 57 into and from the rearview mirror 51.

SUMMARY OF THE INVENTION

It is an object of the present invention to provide a rearview mirror that permits the driver to readily insert and remove a thin recording medium.

To achieve the foregoing objective, the present invention provides a rearview mirror. The rearview mirror is located between a driver's seat and a front passenger's seat in a front section of the passenger compartment of a vehicle. The rearview mirror includes a housing, a reflector and an interface. The housing includes a front surface facing the driver's seat, a rear surface at the opposite side of the front surface. The housing has a slot for receiving a recording medium that stores predetermined data. The recording medium has an inserted part. The slot has a width, which is larger than a width of the inserted part. The recording medium is inserted into the slot at an arbitrary position in the width direction of the slot. The reflector is attached to the front surface of the housing. The interface is located in the housing. The interface performs at least one of reading of data from the recording medium and writing of data to the recording medium. The interface includes a detector, a data input/output unit and a moving mechanism. The detector detects insertion of the recording medium into the slot. The data input/output unit swaps data with the recording medium. The moving mechanism moves one of the data input/output unit and the recording medium to a position where the data input/output unit faces the recording medium.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the following, a first embodiment of the present invention will be described with reference to FIGS. 1 to 6.

Figure 1:
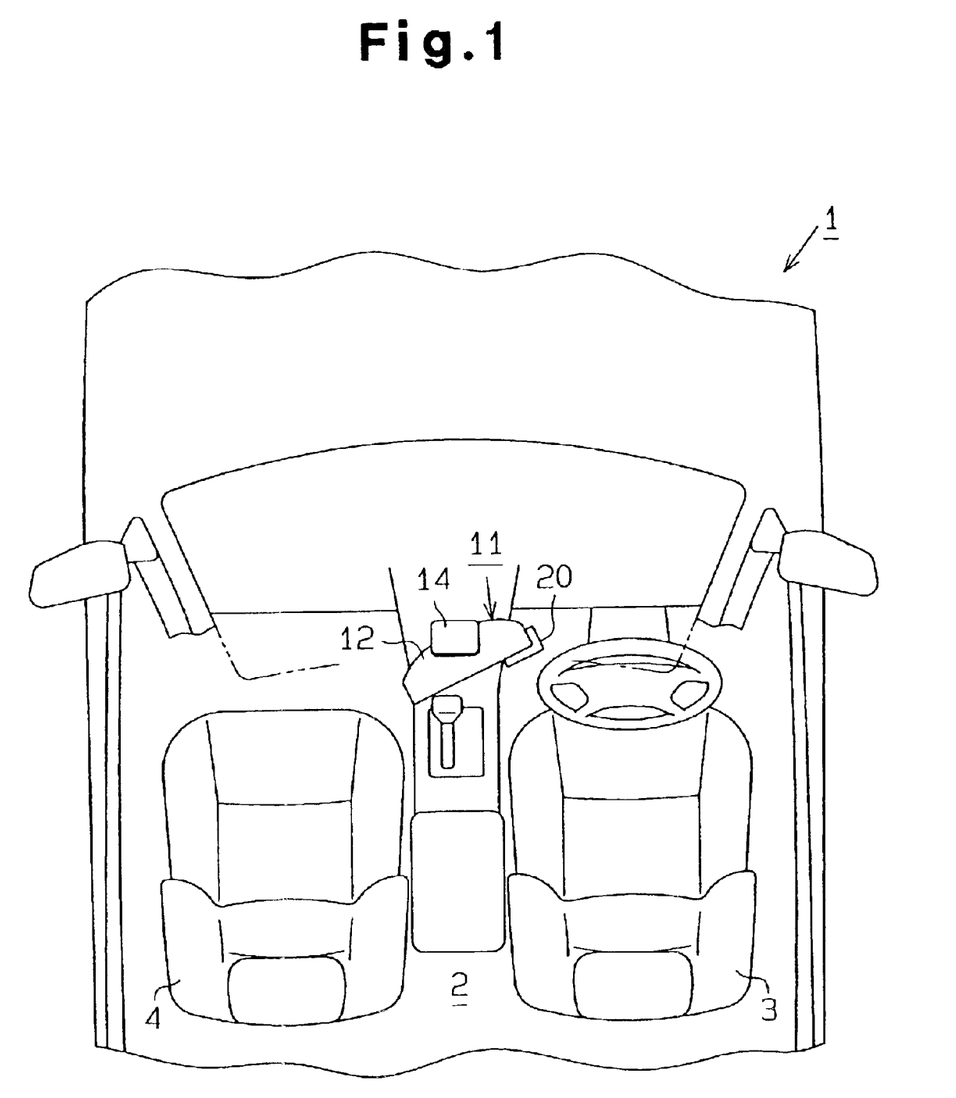
FIG. 1 is a top plan view showing the passenger compartment of a vehicle that is equipped with a rearview mirror according to one embodiment of the present invention.
Figure 2:
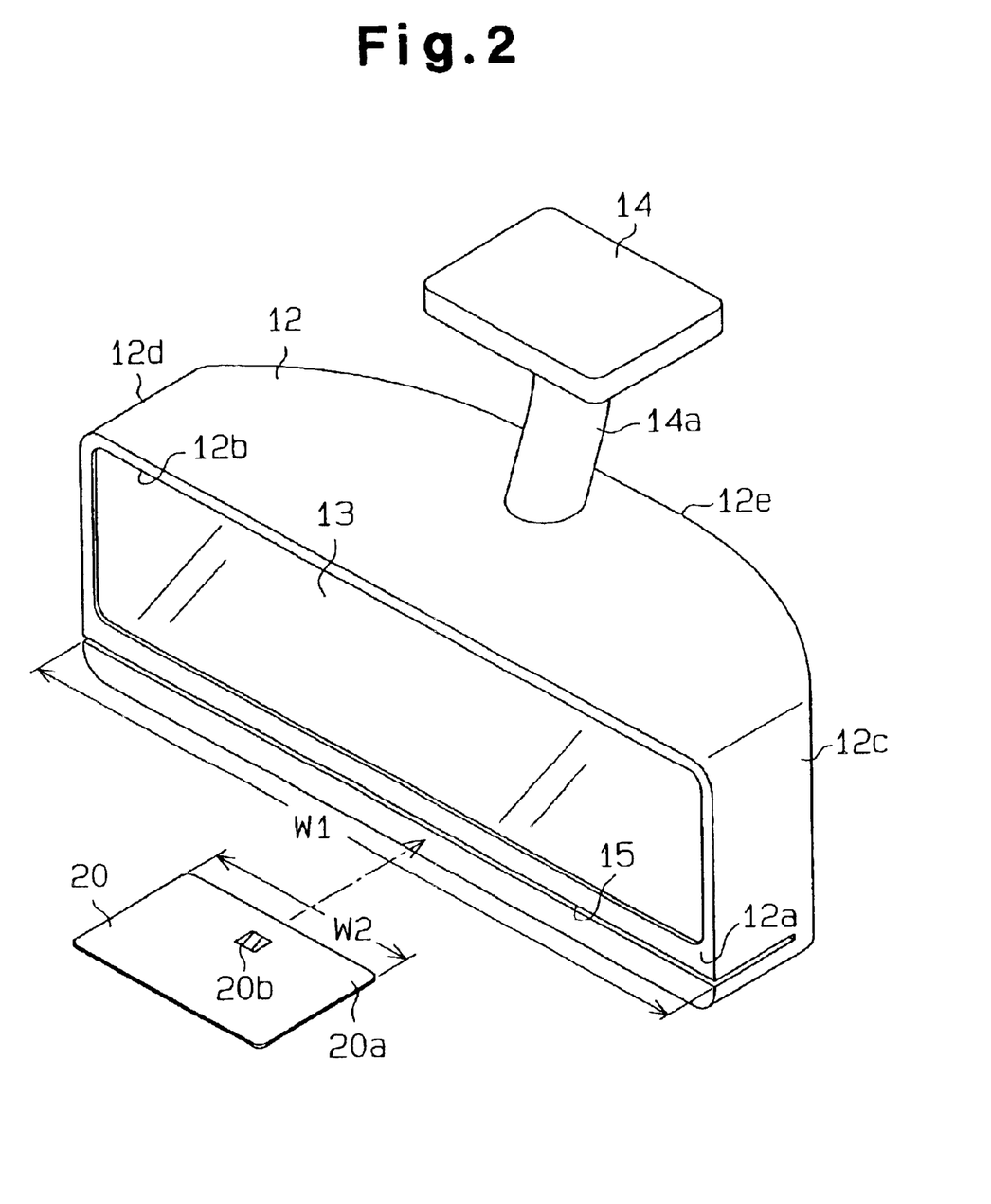
FIG. 2 is a perspective view showing the rearview mirror of FIG. 1.
Figure 3:
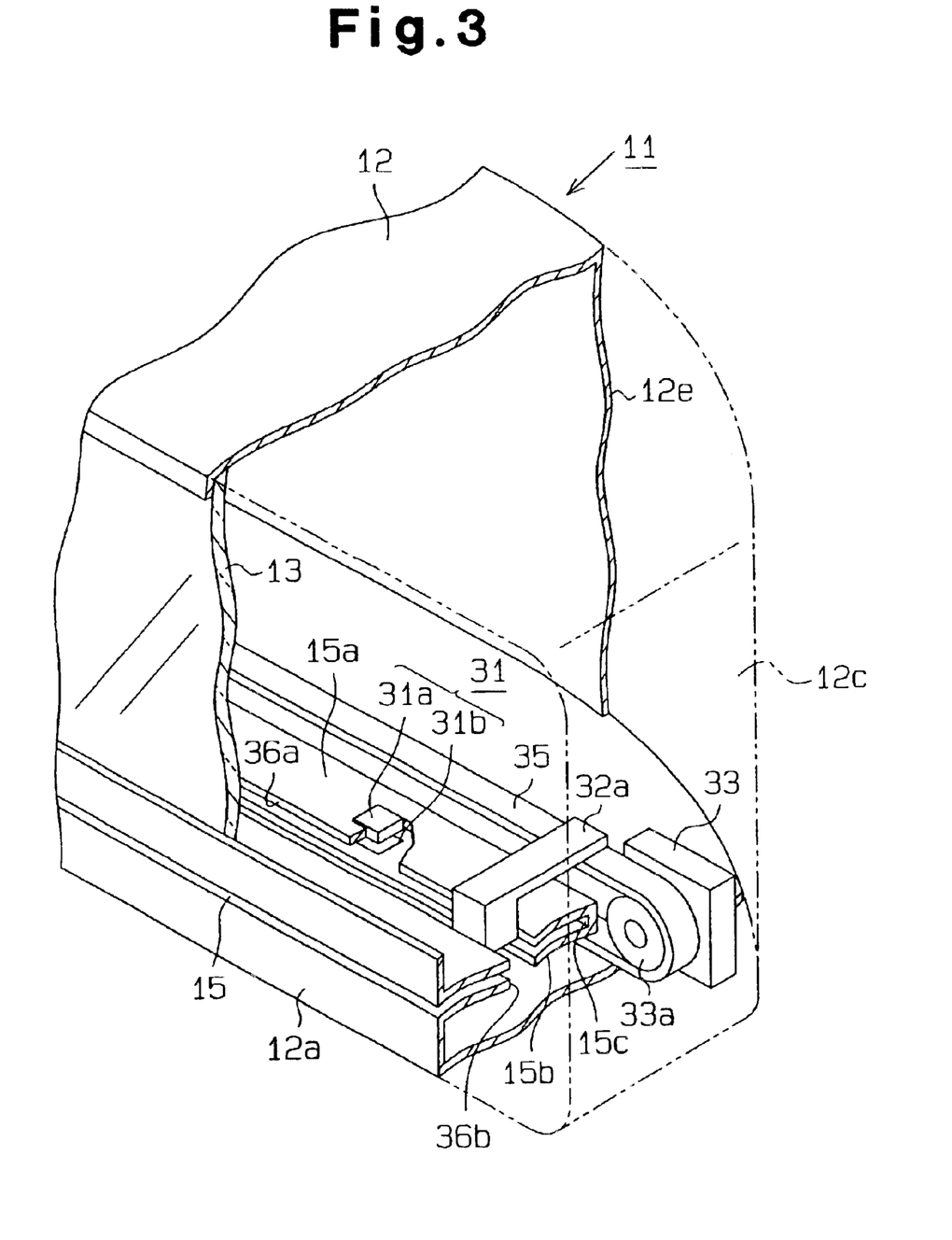
FIG. 3 is a partially cutaway perspective view showing the rearview mirror of FIG. 1.

As shown in FIG. 1, a rearview mirror 11 is located between a driver's seat 3 and a front passenger seat 4 in a front section of a passenger compartment 2 of a vehicle 1. As shown in FIGS. 2 and 3, the rearview mirror 11 comprises a housing 12, a reflector 13, and a fixture 14. An opening 12b is formed on a front surface 12a of the housing 12, and the reflector 13 is fixed in the opening 12b. The fixture 14 is joined on the top surface of the housing 12. The fixture 14 includes a supporting shaft 14a, which is in contact with the housing 12 through a spherical surface. Thus, the housing 12 pivots relative to the supporting shaft 14a in three axial directions.

As shown in FIGS. 2 and 3, a groove 15, or a slot, is formed below the reflector 13 on the front surface 12a of the housing 12. The groove 15 is defined by a first inner wall 15a, a second inner wall 15b, and a bottom wall 15c. The groove 15 extends in the longitudinal direction of the housing 12. More specifically, the groove 15 linearly extends from a first side surface 12c to a second side surface 12d of the housing 12. The length (width) of the groove 15 is larger than the width of the reflector 13 and equal to the width of the housing 12. Therefore, as shown in FIG. 2, the width W1 of the groove 15 is wider than the width W2 of an inserted part 20a of a recording medium, which is an IC card 20 in this embodiment. When facing the reflector 13, a driver can view the groove 15. The IC card 20 is substantially rectangular. The inserted part 20a refers to a wider side edge of the IC card 20. The groove 15 is formed such that one half to two thirds of the IC card 20 can be inserted to the groove 15.

As shown in FIG. 3, the housing 12 contains an interface unit 17 and a data processing unit 18 which make up a car-equipped ETC.

The interface unit 17 comprises a detector 31, a data input/output unit 32, and a motor 33.

The detector 31 is comprised of an optical sensor such as a photo-interrupter. Specifically, as shown in FIG. 3, a light emitting element 31a is provided within the first inner wall 15a, while a light receiving element 31b is provided within the second inner wall 15b such that the light receiving element 31b is exposed to the groove 15. More specifically, the detector 31 is close to the bottom wall 15c of the groove 15 with the light emitting element 31a facing the light receiving element 31b. The detector 31 detects the IC card 20 inserted into the groove 15.

Figure 4:
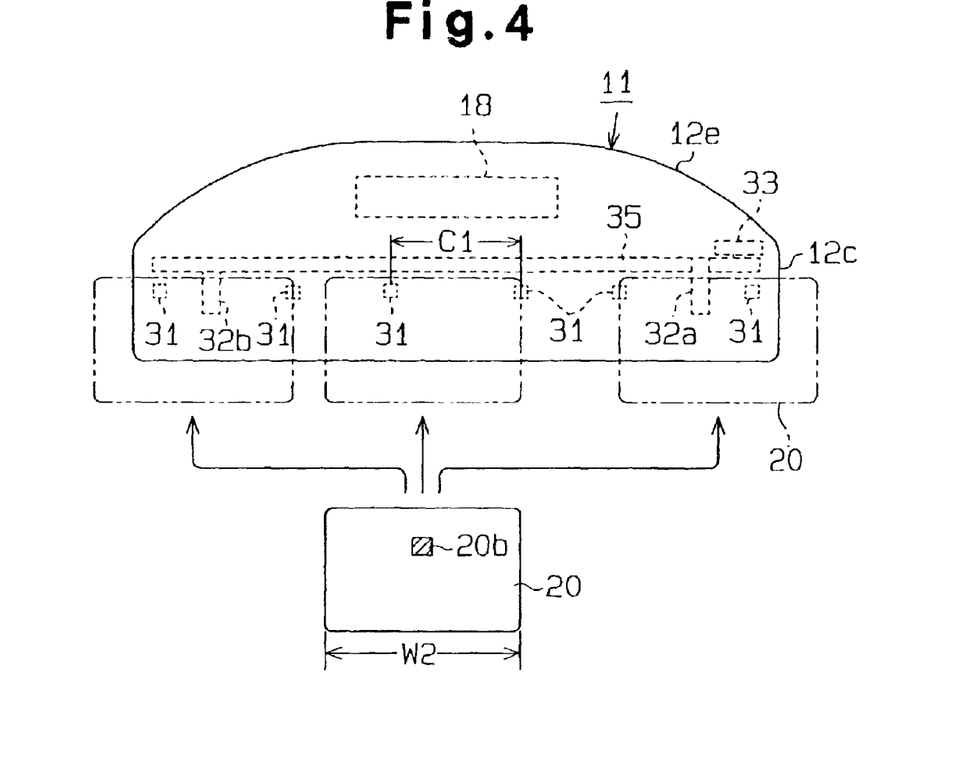
FIG. 4 is a schematic plan view showing the rearview mirror of FIG. 1.

As shown in FIG. 4, a plurality (six in this embodiment) of detectors 31 are located along the longitudinal direction of the housing 12 at predetermined intervals C1. The predetermined interval C1 is narrower than the width W2 of the inserted part 20a of the IC card 20. Therefore, when the IC card 20 is inserted anywhere in the groove 15, the insertion is detected without fail by any of the detectors 31. In this embodiment, the predetermined interval C1 is approximately ⅔ of the width W2 of the inserted part 20a of the IC card 20.

Figure 5:
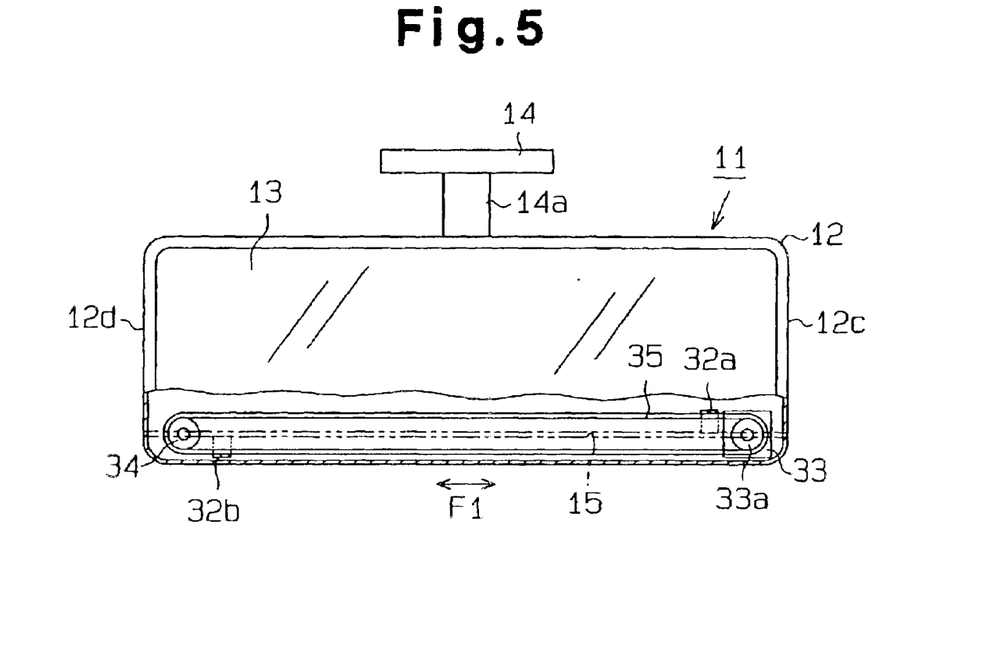
FIG. 5 is a partially cutaway front view of the rearview mirror of FIG. 4.

As shown in FIGS. 3 to 5, the motor 33 is located between the side surface 12c and the rear surface 12e of the housing 12. As shown in FIG. 5, a roller 34 is located near the side surface 12d of the housing 12. A conveyer belt 35 is wound around a rotary shaft 33a of the motor 33 and the roller 34. The rotary shaft 33a and roller 34 are located such that they are positioned above and below the groove 15 in a front view. Therefore, when the motor 33 is driven, the conveyer belt 35 is moved along the longitudinal direction of the housing 12 at positions above and below the groove 15, as indicated by an arrow F1 in FIG. 5. A first element 32a and a second element 32b are attached to the conveyer belt 35. In this embodiment, the first element 32a and the second element 32b are included in the data input/output unit 32. Each element 32a, 32b is substantially in an L-shape, and has its proximal end attached to the conveyer belt 35. Specifically, the first element 32a is attached to a location on the conveyer belt 35 above the groove 15, while the second element 32b is attached to a location on the conveyer belt 35 below the groove 15. The first and second elements 32a, 32b face each other near the center of the housing 12 when the conveyer belt 35 is moved. In this embodiment, the motor 33, roller 34, and conveyer belt 35 function as a moving mechanism for moving the data input/output unit 32. Also, the motor 33, roller 34, and conveyer belt 35 function as an aligning mechanism for aligning the data input/output unit 32 with the IC card 20 such that data can be swapped between the data input/output unit 32 and the IC card 20.

A first hole 36a is formed in the first inner wall 15a of the groove 15. The first hole 36a extends along the longitudinal direction of the housing 12 and is closer to the opening of the groove 15 than the detectors 31 are. Similarly, a second hole 36b is formed in the second inner wall 15b of the groove 15. The second hole 36b extends along the longitudinal direction of the housing 12 and is closer to the opening of the groove 15 than the detectors 31 are. The distal end of the first element 32a is inserted through the first hole 35a, while the distal end of the second element 32b is inserted through the second hole 36b. The distal end surfaces of the respective elements 32a, 32b are substantially flash with the inner surface of the groove 15. A terminal (not shown) is provided at the distal end of each element 32a, 32b in contact with a terminal 20b of the IC card 20, indicted by hatchings in FIGS. 2 and 4.

Figure 6:
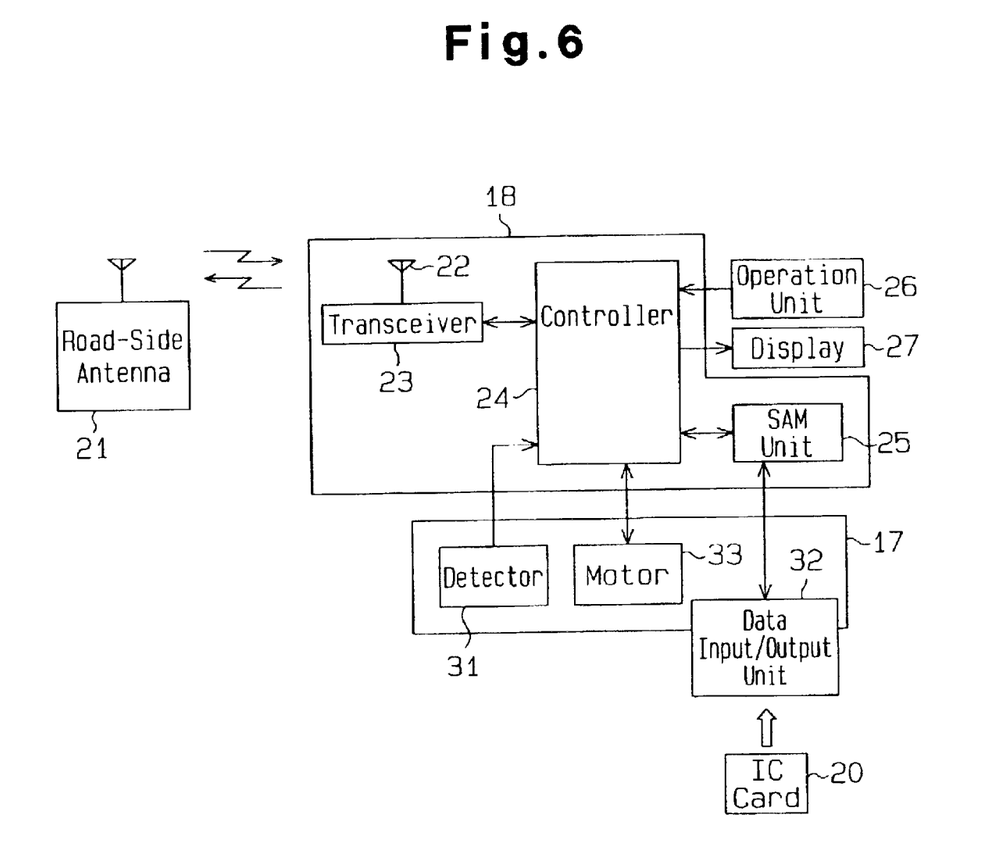
FIG. 6 is a block diagram schematically showing the internal configuration of a data processing unit built in the rearview mirror of FIG. 1.

As shown in FIG. 6, the detector 31, data input/output unit 32, and the motor 33 are electrically connected to the data processing unit 18.

As shown in FIG. 4, the position of the data processing unit 18 is determined such that the data processing unit 18 does not interfere with the detectors 31, data input/output unit 32, motor 33, roller 34, and conveyer belt 35. As shown in FIG. 6, the data processing unit 18 mutually communicates with road-side antennas 21 installed at a toll gate of a toll road. Specifically, the road-side antennas 21 are installed near the entrance and exit of the toll gate, respectively. The data processing unit 18 comprises an antenna 22, a transceiver 23, a controller 24, and an SAM unit 25. The detector 31 and motor 33 are connected to the controller 24, and the data input/output unit 32 is connected to the SAM unit 25.

As the detector 31 detects the IC card 20 inserted into the groove 15, the controller 24 outputs a driving signal to the motor 33 in response to the detection. The motor 33 is driven by this signal, to move the data input/output unit 32 to a position facing to the IC card 20.

The controller 24 stops driving the motor 33 at a position at which the terminal of the data input/output unit 32 comes into contact with the terminal 20b of the IC card 20 to permit the data input/output unit 32 to communicate data with the IC card 20. Therefore, even when the IC card 20 is inserted at an arbitrary position of the groove 15, data can be communicated between the IC card 20 and data processing unit 18.

When a vehicle equipped with the rearview mirror 11 enters a toll road, a radio wave that carries encrypted predetermined data is output from the road-side antenna 21 installed near the entrance of a toll gate. As the transceiver 23 of the data processing unit 18 receives the radio wave through the antenna 22, the data processing unit 18 demodulates the radio wave to a pulse signal to generate a received signal and outputs the generated received signal to the controller 24. The controller 24 instructs the SAM unit 25 to decrypt the received signal, and outputs the decrypted data to the data input/output unit 32. Subsequently, the data input/output unit 32 writes the decrypted data into the IC card 20. The predetermined data includes data related to the location and time at which the vehicle entered the toll road, and the type of vehicle (light car, ordinary car, truck, bus, and the like).

On the other hand, when the vehicle exits the toll road, a radio wave including a response request signal is output from a road-side antenna 21 installed near an exit. Upon receipt of this response request signal, the controller 24 reads data related to the location from which the vehicle entered the toll road, and the type of vehicle, written into the IC card 20, through the data input/output unit 32, and encrypts the data using the SAM unit 25. The controller 24 causes the transceiver 23 to modulate the encrypted data to a radio wave at a predetermined frequency, and radiates the radio wave from the antenna 22. In summary, the controller 24 reads data related to the location from which the vehicle entered the toll road, and the type of vehicle from the IC card 20, encrypts the information, and transmits the encrypted data to the road-side antenna 21. The road-side antenna 21 radiates data indicative of the fee calculated from the encrypted data, the used date and time to the data processing unit 18. The controller 24 writes the data into the IC card 20.

An operation unit 26 and a display 27 are electrically connected to the controller 24. The operation unit 26 and the display 27 are located on the front surface 12a of the housing 12 (not shown). As a passenger operates the operation unit 26, the display 27 displays information on a toll gate, information on a fare to the destination, and the like, in response to the operation.

The foregoing embodiment provides the following advantages.

(1) The IC card 20 can be inserted and removed into and from the groove 15 at an arbitrary position in the longitudinal direction of the housing 12. Further, as a detector 31 detects the inserted IC card 20, the data input/output unit 32 is moved by the motor 33 to a position at which it faces the IC card 20. Therefore, even when the IC card 20 is inserted anywhere in the groove 15, data can be communicated without fail between the data input/output unit 32 and IC card 20. Therefore, the operator can insert and remove the IC card 20 according to his preference, and can readily insert and remove the IC card 20 into and from the rearview mirror 11.

(2) The insert port for the IC card 20 is provided in the front surface 12a of the housing 12. Therefore, the operator can readily view the insert port for the IC card 20 without fail. This permits the operator to readily insert and remove the IC card 20 into and from the groove 15. By forming the groove 15 to extend in the longitudinal direction of the housing 12, a long overall length can be ensured for the groove 15. It is therefore possible to provide a wider range over which the operator can insert the IC card 20 into the groove 15.

(3) The interval C1 between the adjacent detectors 31 is set smaller than the width W2 of the inserted part 20a of the IC card 20. Therefore, even when the IC card 20 is inserted into the groove 15 at any position, the inserted IC card 20 can be detected by any detector 31 without fail.

(4) Each detector 31 is located at a location closer to the bottom wall 15c of the groove 15 than the distal end of the data input/output unit 32. Therefore, when the IC card 20 is inserted to the bottom wall 15c of the groove 15, the detector 31 detects the inserted IC card 20. In other words, the detector 31 does not detect the inserted IC card 20 when the IC card 20 is not sufficiently inserted. It is therefore possible to prevent the operator from incompletely inserting the IC card 20 and accordingly preventing data communications between the IC card 20 and data input/output unit 32 with the insufficiently inserted IC card 20.

(5) The motor 33 moves the data input/output unit 32 until it faces the IC card 20. Therefore, the motor 33 is less burdened with the driving load than the case in which the motor 33 moves the IC card 20. Therefore, it is possible to use the belt conveyer 35 of a smaller width, and a small-sized, small-power motor. In other words, the moving mechanism can be reduced in size to prevent an increase in size of the rearview mirror 11.

(6) The first element 32a of the data input/output unit 32 is located above the groove 15 and the second element 32b of the data input/output unit 32 is located below the groove 15, respectively. Therefore, when the IC card 20 is inserted into the groove 15 with the terminal 20b of the IC card 20 oriented upward, data is communicated by the first element 32a. On the other hand, when the IC card 20 is inserted into the groove 15 with the terminal 20b oriented downward, data is communicated by the second element 32b. In other words, data can be communicated without fail when the IC card 20 is inserted into the groove 15 irrespective of whether the terminal 20b is oriented upward or downward.

It should be apparent to those skilled in the art that the present invention may be embodied in many other specific forms without departing from the spirit or scope of the invention. Particularly, it should be understood that the invention may be embodied in the following forms.

Each detector 31 may be located closer to the opening of the groove 15 than the distal end of the data input/output unit 32.

Each detector unit 31 is not limited to an optical sensor. Instead, the inner walls 15a, 15b of the groove 15 may be provided, for example, with electrodes that contact each other when the IC card 20 is not inserted therebetween. Even with such configuration, the IC card 20 inserted into the groove 15 can be detected without fail, since the respective electrodes are spaced apart and become non-conductive when the IC card 20 is inserted therebetween.

A narrower side edge of the IC card 20 may be designated as the inserted part 20a.

The moving mechanism may be comprised, for example, of a linear motor. In other words, any moving mechanism may be applied as long as it can move the data input/output unit 32 along the groove 15 and position the data input/output unit 32 at a position at which it faces the IC card 20.

The IC card 20 may be moved to a position at which it faces the data input/output unit 32.

One of the first and second elements 32a, 32b may be omitted.

The location of the groove 15 is not limited to the front surface 12a. For example, the groove 15 may be provided above the reflector 13. Also, the groove 15 may be provided in the lower surface of the housing 12. It is however more desirable to provide the groove 15 at a location at which the operator can view the groove 15 when the operator directly faces the mirror surface 13.

The thin recording medium is not limited to the IC card 20, but any thin recording medium may be applied such as card-type recording media, e.g. a magnetic card, disk shaped recording media, e.g. a floppy disk, a CD-ROM and a mini-disk, plate-type recording media, e.g. a memory stick.

The data processing unit 18 need not be necessarily contained in the housing 12.

The rearview mirror 11 may be used for purposes other than paying fares for toll roads. For example, the rear view mirror 11 may be used for paying at drive-through fast-food restaurants, and for paying fees at parking areas and gas stations. In addition, the rearview mirror 11 may be used for opening and closing gates provided at the entrance and exit of a parking area of a company, a shutter of a garage, and the like.

Therefore, the present examples and embodiments are to be considered as illustrative and not restrictive and the invention is not to be limited to the details given herein, but may be modified within the scope and equivalence of the appended claims.

What is claimed is:

1. A rearview mirror located between a driver's seat and a front passenger's seat in a front section of the passenger compartment of a vehicle, the rearview mirror comprising:
a housing, wherein the housing includes a front surface facing the driver's seat, a rear surface at the opposite side of the front surface, wherein the housing has a slot for receiving a recording medium that stores predetermined data, wherein the recording medium has an inserted part, wherein the slot has a width, which is larger than a width of the inserted part, wherein the recording medium is inserted into the slot at an arbitrary position in the width direction of the slot;
a reflector attached to the front surface of the housing; and
an interface located in the housing, wherein the interface performs at least one of reading of data from the recording medium and writing of data to the recording medium, wherein the interface includes:
a detector for detecting insertion of the recording medium into the slot;
a data input/output unit for swapping data with the recording medium; and
a moving mechanism for moving one of the data input/output unit and the recording medium to a position where the data input/output unit faces the recording medium.

2. The rearview mirror according to claim 1, wherein the slot extends in a longitudinal direction of the housing in the front surface of the housing.

3. The rearview mirror according to claim 1, wherein the detector is one of a plurality of detectors, wherein the detectors are located along the width direction of the slot in the vicinity of the slot, wherein the distance between each adjacent pair of the detectors is narrower than the width of the inserted part of the recording medium.

4. The rearview mirror according to claim 1, wherein the slot is a groove, wherein the distance between the detector and the bottom of the groove is shorter than the distance between the data input/output unit and the bottom of the groove.

5. A rearview mirror located between a driver's seat and a front passenger's seat in a front section of the passenger compartment of a vehicle, the rearview mirror comprising:
a housing, wherein the housing includes a front surface facing the driver's seat, a rear surface at the opposite side of the front surface, wherein the housing has a slot defined by a pair of opposing walls, wherein slot receives a recording medium that stores predetermined data, wherein the recording medium has an inserted part, wherein the slot has a width, which is larger than a width of the insert potion, wherein the recording medium is inserted into the slot at an arbitrary position in the width direction of the slot;
a reflector attached to the front surface of the housing; and
an interface located in the housing, wherein the interface performs at least one of reading of data from the recording medium and writing of data to the recording medium, wherein the interface includes:
a plurality of detectors for detecting insertion of the recording medium into the slot;
a plurality of data input/output units for swapping data with the recording medium, wherein at least one of the data input/output units is located in one of the opposing walls, and the other data input/output units are located in the other one of the opposing walls; and
a moving mechanism for moving one of the set of the data input/output unit and the recording medium to a position where at least one data input/output unit faces the recording medium.

6. The rearview mirror according to claim 5, wherein the slot extends in a longitudinal direction of the housing in the front surface of the housing.

7. The rearview mirror according to claim 5, wherein the distance between each adjacent pair of the detectors is narrower than the width of the inserted part of the recording medium.

8. The rearview mirror according to claim 5, wherein the distance between each detector and the bottom of the groove is shorter than the distance between the data input/output unit and the bottom of the groove.

9. A rearview mirror located between a driver's seat and a front passenger's seat in a front section of the passenger compartment of a vehicle, the rearview mirror comprising:
a housing, wherein the housing includes a front surface facing the driver's seat, a rear surface at the opposite side of the front surface, wherein the housing has a slot for receiving a recording medium that stores predetermined data, wherein the recording medium has an inserted part, wherein the slot has a width, which is larger than a width of the insert potion, wherein the recording medium is inserted into the slot at an arbitrary position in the width direction of the slot;
a reflector attached to the front surface of the housing; and
an interface located in the housing, wherein the interface performs at least one of reading of data from the recording medium and writing of data to the recording medium, wherein the interface includes:
a detector for detecting insertion of the recording medium to the slot;
a data input/output unit for swapping data with the recording medium; and
an aligning mechanism for aligning the data input/output unit with the recording medium such that data can be swapped between the data input/output unit and the recording medium.

10. The rearview mirror according to claim 9, wherein the slot extends in a longitudinal direction of the housing in the front surface of the housing.

11. The rearview mirror according to claim 9, wherein the detector is one of a plurality of detectors, wherein the detectors are located along the width direction of the slot in the vicinity of the slot, wherein the distance between each adjacent pair of the detectors is narrower than the width of the inserted part of the recording medium.

12. The rearview mirror according to claim 9, wherein the slot is a groove, wherein the distance between the detector and the bottom of the groove is shorter than the distance between the data input/output unit and the bottom of the groove.

* * * * *

UNITED STATES PATENT AND TRADEMARK OFFICE
CERTIFICATE OF CORRECTION

PATENT NO. : 6,742,905 B2 Page 1 of 1
DATED : June 1, 2004
INVENTOR(S) : Terumasa Suyama et al.

It is certified that error appears in the above-identified patent and that said Letters Patent is hereby corrected as shown below:

Title page,
Item [73], Assignee, delete "Kabushiki Kaisha Tokai Rika Denki Seisakucho", and insert therefor -- Kabushiki Kaisha Tokai Rika Denki Seisakusho --

Signed and Sealed this

First Day of March, 2005

JON W. DUDAS
*Director of the United States Patent and Trademark Office*